(12) United States Patent
Mangal et al.

(10) Patent No.: US 9,388,642 B2
(45) Date of Patent: Jul. 12, 2016

(54) FLEXIBLE PIPE FATIGUE MONITORING BELOW THE BEND STIFFENER OF A FLEXIBLE RISER

(75) Inventors: Lars Mangal, Hellerup (DK); Lenny Sutherland, Aberdeenshire (GB); Russell Smith, Southampton (GB); Damon Roberts, Hampshire (GB)

(73) Assignee: Schlumberger Technology Corporation, Houston, TX (US)

( * ) Notice: Subject to any disclaimer, the term of this patent is extended or adjusted under 35 U.S.C. 154(b) by 1058 days.

(21) Appl. No.: 12/920,492

(22) PCT Filed: Mar. 3, 2009

(86) PCT No.: PCT/GB2009/000584
§ 371 (c)(1),
(2), (4) Date: Apr. 5, 2011

(87) PCT Pub. No.: WO2009/109745
PCT Pub. Date: Sep. 11, 2009

(65) Prior Publication Data
US 2011/0178730 A1    Jul. 21, 2011

Related U.S. Application Data

(60) Provisional application No. 61/033,956, filed on Mar. 5, 2008.

(51) Int. Cl.
*G01N 3/08* (2006.01)
*E21B 17/01* (2006.01)
(Continued)

(52) U.S. Cl.
CPC ........... *E21B 17/017* (2013.01); *E21B 47/0006* (2013.01); *G01M 5/0025* (2013.01); *G01M 5/0091* (2013.01); *G01M 11/086* (2013.01)

(58) Field of Classification Search
CPC ..................................................... G01D 5/268
USPC .............. 73/768, 847, 43; 702/41, 43, 54, 91, 702/104
See application file for complete search history.

(56) References Cited

U.S. PATENT DOCUMENTS 7,257,483 B2 * 8/2007 Blain et al. .................... 701/536
7,265,832 B2 * 9/2007 Montgomery et al. ....... 356/338
(Continued)

FOREIGN PATENT DOCUMENTS

EP     1635034 B1 * 6/2009

OTHER PUBLICATIONS

Fatigue Monitoring of Flexible Rises Using Novel Shape Sensing Technology R.D>G. Roberts, Insensys Oil & Gas; S. Garnham, BP and B. D'All Technip 2007.*
(Continued)

*Primary Examiner* — Tung S Lau
(74) *Attorney, Agent, or Firm* — Chamberlain Hrdlicka

(57) ABSTRACT

A flexible pipe fatigue monitoring system 30 comprising a pipe monitoring system 32, 40, 42 adapted to be provided on a flexible pipe 10 having a bend stiffener 18. The pipe monitoring system 40, 42 is provided on the pipe 10 below the bend stiffener 18. The monitoring system 32 measures one or more of bending, tension and torsion of the pipe 10. The pipe monitoring system 30 comprises sensor carrier members 40, 42 adapted to be coupled to the pipe 10 and at least one fiber Bragg grating strain sensor embedded in a carrier member 40, 42. An inclinometer 34 is provided on one carrier member 40 to measure the incline of the pipe 10 relative to earth. A central processor 38 is provided to receive bending, tension and torsion information and incline information, and is operable to determine pipe fatigue from said information. A method of flexible pipe fatigue monitoring is also provided.

15 Claims, 3 Drawing Sheets

(51) Int. Cl.
*E21B 47/00* (2012.01)
*G01M 5/00* (2006.01)
*G01M 11/08* (2006.01)

(56) References Cited

U.S. PATENT DOCUMENTS

| | | | | |
|---|---|---|---|---|
| 7,277,162 | B2 * | 10/2007 | Williams | 356/32 |
| 7,296,480 | B2 * | 11/2007 | De Aquino | 73/847 |
| 7,578,203 | B2 * | 8/2009 | Andersen et al. | 73/861.21 |
| 7,646,945 | B2 * | 1/2010 | Jones et al. | 385/13 |
| 7,702,190 | B2 * | 4/2010 | Hao et al. | 385/13 |
| 2004/0113104 | A1 * | 6/2004 | Maida, Jr. | 250/573 |
| 2006/0045408 | A1 * | 3/2006 | Jones | E21B 17/01 385/12 |
| 2006/0071158 | A1 * | 4/2006 | Van Der Spek | 250/227.14 |
| 2008/0013879 | A1 * | 1/2008 | Mossman | 385/13 |
| 2008/0204706 | A1 * | 8/2008 | Magne et al. | 356/32 |
| 2009/0107558 | A1 * | 4/2009 | Quigley et al. | 137/15.01 |

OTHER PUBLICATIONS

S. Cauchi, Fiber-Optic Sensors for Monitoring Pipe Bending Due to Ground Movement, Pipeline & Gas Journal / Jan. 2007, pp. 36, 38, 40.*

* cited by examiner

FLEXIBLE PIPE FATIGUE MONITORING BELOW THE BEND STIFFENER OF A FLEXIBLE RISER

CROSS REFERENCE TO RELATED APPLICATIONS

This invention and application is entering the national phase of Patent Application No. PCT/GB2009/000584, entitled "Flexible Pipe Fatigue Monitoring Below the Bend Stiffener of a Flexible Riser," filed on Mar. 3, 2009, which in turn claims the benefit of priority from U.S. Provisional Patent Application Ser. No. 61/033,956, filed on Mar. 5, 2008. The entire content of all of the aforementioned applications are hereby incorporated by reference herein.

TECHNICAL FIELD

The invention relates to a flexible pipe fatigue monitoring system and a method of monitoring the fatigue of a flexible pipe.

BACKGROUND ART

Flexible risers are commonly used in subsea oil and gas production installations to connect floating production, storage and offload (FPSO) facilities with seabed oil and/or gas flowlines. The end of the flexible riser at the FPSO is connected to the FPSO piping system. A bend stiffener is provided around the end of the riser at the connection to the FPSO. The main role of the bend stiffener is to absorb bending moment applied to the pipe by the movement of the FPSO and wave action on the riser. Without a bend stiffener the riser will overbend, which will result in early failure of the riser. The area of the bend stiffener corresponds to a high loading zone for the flexible riser and is known as being critical in terms of fatigue of the riser. The main fatigue mechanism of the riser is due to bending. An assessment of the fatigue applied to the riser is critical to estimating its remaining life time.

A device for controlling stiffeners of flexible pipes is described in WO 2006/003308 which uses optical fibres containing fibre Bragg gratings which are embedded within a bend stiffener to monitor the curvature/bending of the pipe within the bend stiffener region. This device suffers from the problem that it can only be used for new pipeline installations since bend stiffeners are installed for the lifetime of an installation and are not designed for replacement.

SUMMARY OF THE INVENTION

It is an object of the invention to provide an improved flexible pipe fatigue monitoring system and an improved method of monitoring the fatigue of a flexible pipe.

A first aspect of the invention provides a flexible pipe fatigue monitoring system comprising:
   a pipe monitoring system adapted to be provided on a flexible pipe having a bend stiffener provided thereon, the pipe monitoring system being adapted to be provided on the said flexible pipe generally adjacent to the said bend stiffener and being arranged to measure one or more mechanical parameters of the said flexible pipe, the pipe monitoring system comprising sensor carrier apparatus adapted to be coupled to the said flexible pipe and at least one strain sensor carried by the said sensor carrier apparatus;
   a pipe incline monitoring system operable to determine the incline of the said flexible pipe relative to the said bend stiffener; and
   a central processor adapted to receive said mechanical parameter information from said pipe monitoring system and said incline measurement information from said pipe incline monitoring system, and operable to determine pipe fatigue from said information.

The system enables fatigue monitoring to be carried out on a flexible pipe but without requiring measurements to be made within the area of the bend stiffener itself. The system can thus be used on both new and existing pipeline installations, and provides a cost effective solution to providing fatigue monitoring on existing pipeline installations.

In an embodiment, said pipe monitoring system is adapted to measure one or more of bending, torsion and tension of the said flexible pipe.

In an embodiment, the said sensor carrier apparatus comprises an at least part-cylindrical shaped carrier member adapted for location on the said flexible pipe. The said shaped carrier member may be formed of a composite material. The said at least one strain sensor may be embedded within the said shaped carrier member. A plurality of said shaped carrier members may be provided. The said pipe monitoring system may further comprise mechanical clamp apparatus adapted to clamp the or each said shaped carrier member to the said flexible pipe.

In an embodiment, the said pipe monitoring system comprises a plurality of strain sensors, the said strain sensors being provided at a plurality of locations on the or each said sensor carrier apparatus such that the said pipe monitoring system is adapted to measure said one or more mechanical parameters at a plurality of locations on the said flexible pipe. The or each said strain sensor may comprise a fibre Bragg grating provided within an optical fibre carried by the said sensor carrier apparatus.

In an embodiment, the said pipe monitoring system further comprises an optical interrogation system, adapted to determine a reflective wavelength of the or each said fibre Bragg grating, and a local processor adapted to receive wavelength information from the said optical interrogation system and operable to determine one or more of bending, torsion and tension of the said flexible pipe from said wavelength information. The said local processor may further be arranged to store measurements of said one or more of bending, torsion and tension of the said flexible pipe.

In an embodiment, the said pipe incline monitoring system comprises an inclinometer provided on the said sensor carrier apparatus. The said inclinometer is operable to measure the incline of the said sensor carrier apparatus, and thus the said flexible pipe, relative to the earth.

In an embodiment, the said flexible pipe comprises a flexible riser pipe connected at one end to a moving platform, such as a floating production, storage and offload (FPSO) platform of a subsea oil and/or gas production facility. The said bend stiffener may be provided at said one end.

In an embodiment, the said pipe incline monitoring system further comprises a positioning system provided on the said floating production, storage and offload platform and operable to determine the orientation of the said platform relative to the earth.

In an embodiment, the said pipe monitoring system, inclinometer and positioning system are operable to provide synchronized measurements.

In an embodiment, the said central processor is adapted to receive incline measurement information from the said inclinometer and orientation measurement information from said positioning system and is operable to determine the incline of the said flexible pipe relative to the said bend stiffener.

In an embodiment, the said central processor is operable to apply a model of the mechanical properties of the said flexible pipe and the said bend stiffener to the said bending and/or tension and/or torsion information from said pipe monitoring system and said inclination measurement information from said pipe incline monitoring system, and to thereby determine one or more of bending, torsion and tension of the pipe adjacent to said bend stiffener. The said bending, torsion and tension of the pipe adjacent to said bend stiffener may be provided in real-time. In an embodiment, the said central processor is further operable to determine pipe fatigue from said bending, torsion and tension of the said flexible pipe adjacent to said bend stiffener.

A second aspect of the invention provides a method of monitoring the fatigue of a flexible pipe having a bend stiffener provided thereon, the method comprising:

measuring one or more mechanical parameters of the said flexible pipe at a location on the said flexible pipe adjacent to the said bend stiffener;

determining the incline of the said flexible pipe relative to the said bend stiffener at said location; and determining pipe fatigue from said mechanical parameter information and said incline measurement information.

The method enables fatigue monitoring to be carried out on a flexible pipe but without requiring measurements to be made within the area of the bend stiffener itself. The method can thus be in relation to both new and existing pipeline installations, and provides a cost effective solution to carrying out fatigue monitoring on existing pipeline installations.

In an embodiment, the method comprises measuring one or more of bending, torsion and tension of the said flexible pipe. The method may comprise measuring one or more of bending, torsion and tension of the said flexible pipe by measuring strain at one or more locations on the said flexible pipe and converting said strain measurements into one or more of one or more of bending, torsion and tension of the said flexible pipe.

In an embodiment, the method comprises determining the incline of the said flexible pipe relative to the earth and determining the orientation of the said bend stiffener relative to the earth, and from said incline relative to the earth and said orientation, determining the incline of the said flexible pipe relative to the said bend stiffener.

In an embodiment, the said flexible pipe comprises a flexible riser pipe connected at one end to a moving platform, such as a floating production, storage and offload (FPSO) platform of a subsea oil and/or gas production facility, and the said bend stiffener is provided at said one end, and the method comprises determining the orientation of the said platform.

In an embodiment, the said bending, torsion and tension measurement information, incline of the said flexible pipe and orientation of the said platform are provided in synchronicity.

In an embodiment, the method comprises applying a model of mechanical properties of the said flexible pipe and the said bend stiffener to the said bending and/or tension and/or torsion measurement information and said incline measurement information to thereby determine one or more of bending, torsion and tension of the pipe adjacent to said bend stiffener. The said bending, torsion and tension of the pipe adjacent to said bend stiffener may be provided in real-time.

In an embodiment, the method further comprises determine pipe fatigue from said bending, torsion and tension of the pipe adjacent to said bend stiffener.

Embodiments of the invention will now be described in detail, by way of example only, with reference to the accompanying drawings.

DESCRIPTION OF EMBODIMENTS OF THE INVENTION

Figure 1:
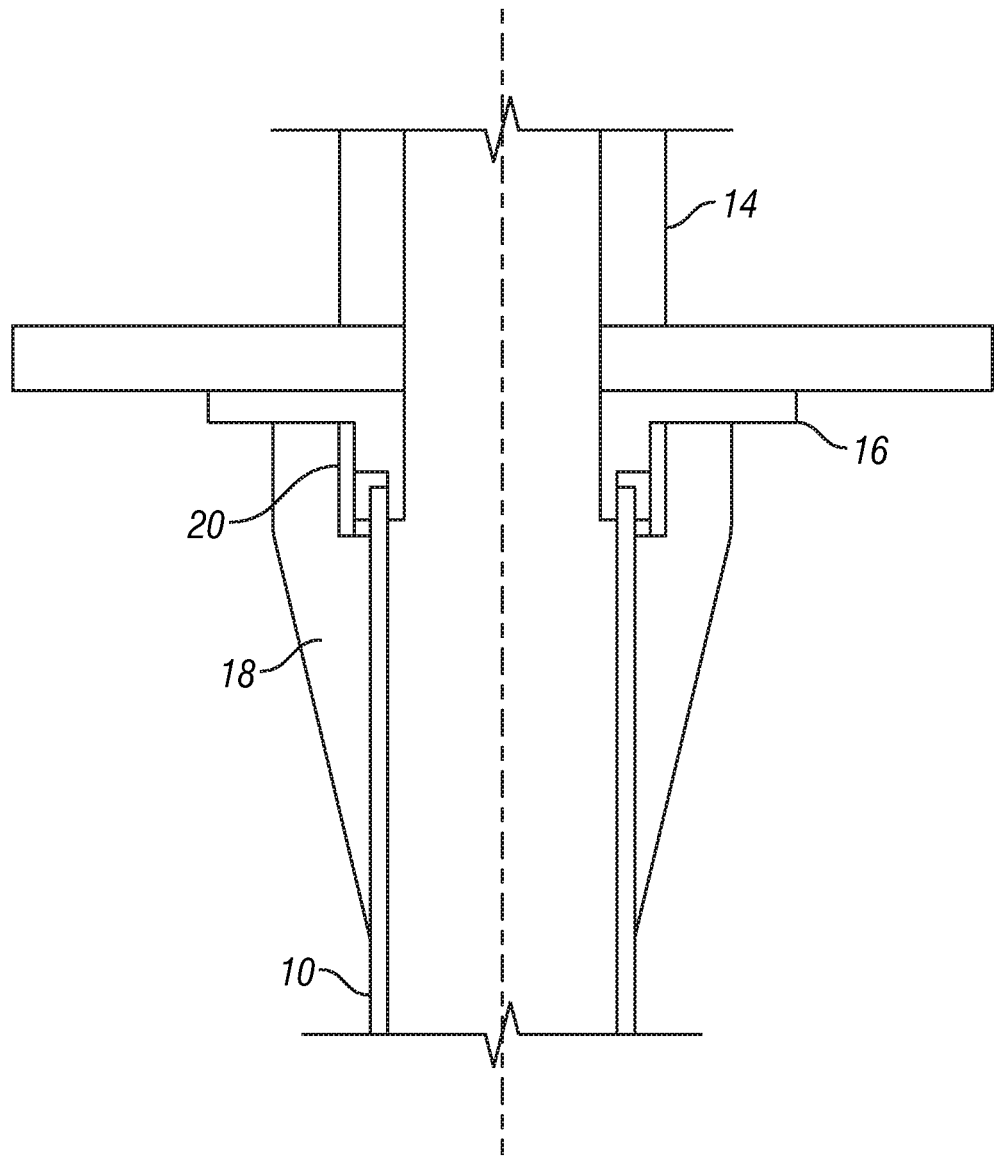
FIG. 1 is a simplified diagrammatic cross-sectional view of the end of a flexible riser.

FIG. 1 shows a typical connection of a flexible riser 10 to an FPSO (not shown). The riser 10 is connected at one end to production piping 12, 14 of the FPSO, via a mounting flange 16. A bend stiffener 18 is provided around the end of the riser 10. The bend stiffener 18 has a conical shape with a central bore through which the riser 10 is located. The bend stiffener is made out of a polymer material, typically polypropylene. The bend stiffener 18 is coupled to the production piping 12, 14 of the FPSO by means of an end fitting housing 20.

The main role of the bend stiffener 18 is to absorb bending forces applied to the pipe by the movement of the FPSO and wave action on the riser 10.

Figure 2:
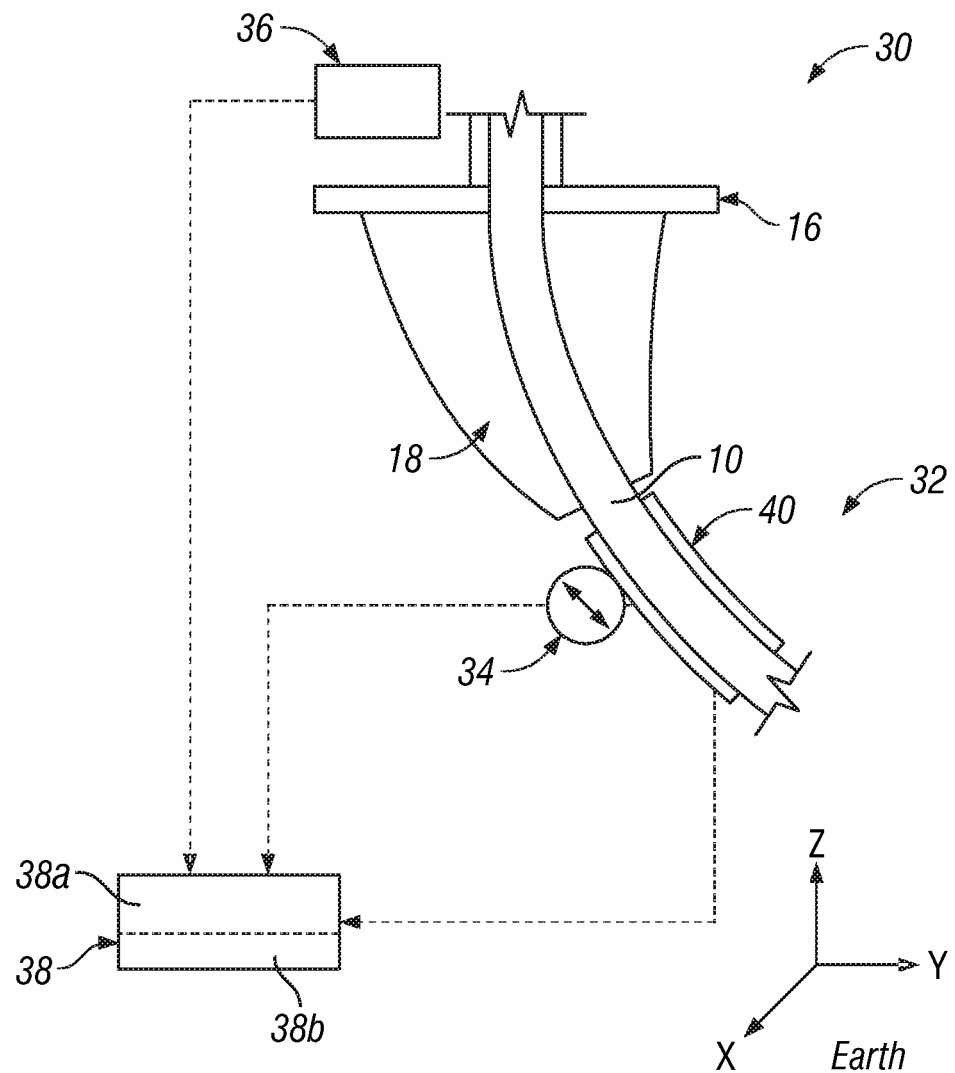
FIG. 2 is a schematic representation of a flexible pipe fatigue monitoring system according to a first embodiment of the invention.
Figure 3:
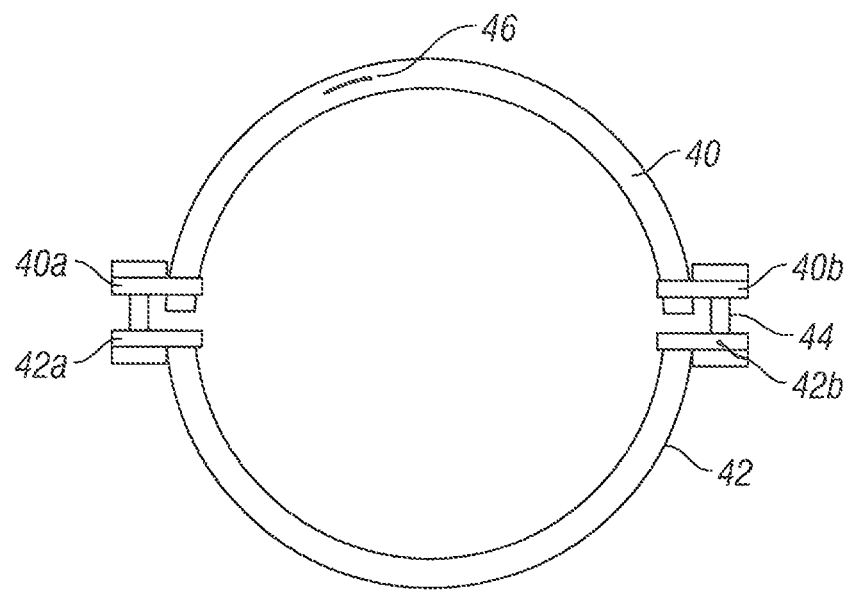
FIG. 3 is a diagrammatic cross-sectional view of the pipe monitoring system of the system of FIG. 2.

Referring to FIGS. 2 and 3, a first embodiment of the invention provides a flexible pipe fatigue monitoring system 30, comprising a pipe monitoring system 32, a pipe incline monitoring system 34, 36 and a central processor 38.

The pipe monitoring system 32 comprises sensor carrier apparatus in the form of first and second carrier members 40, 42. The carrier members 40, 42 are each half-cylindrical in shape and are adapted to be coupled to the external surface of the riser 10. The carrier members 40, 42 are formed from a composite material. The carrier members 40, 42 thus form composite shells adapted for location around the riser 10. Mechanical clamp apparatus in the form of clamp projections 40a, 40b, 42a, 42b and bolts 44 are provided for securely coupling the carrier members 40, 42 to the riser 10.

A plurality of optical fibre Bragg grating (FBG) strain sensors 46 (only one is shown in the drawing for simplicity) are provided embedded within the carrier members 40, 42. The FBGs 46 are arranged to measure bending, tension and torsion of the riser 10. The operation and use of FBG strain sensors to make bending, tension and torsion measurements will be well known to the person skilled in the art and will not be described in detail here.

The pipe monitoring system 32 further comprises an optical interrogation system (not shown), adapted to determine the central reflective wavelength of each FBG 46. The structure and operation of FBG interrogation systems will be well known to the person skilled in the art, and so they will not be described in detail here.

As the riser 10 moves, the bending, tension and torsion of the riser will change, causing corresponding changes in the strain experienced by the FBGs 46, and thus changes in the central reflective wavelengths of the FBGs 46. The wavelengths of the FBGs 46 are measured using the optical interrogation system and transmitted to a local processor (not shown). The local processor is operable to convert the measured wavelengths into the strain experienced by each FBG 46, and, from the strain information, to determine bending, torsion and tension of the riser 10. The local processor stores the bending, torsion and tension values and transmits the values to the central processor 38.

As shown in FIG. 2, the sensor carrier members 40, 42 are adapted to be provided on the riser generally adjacent to the bend stiffener 18.

The pipe incline monitoring system 34, 36 comprises an inclinometer 34 provided on one of the sensor carrier members 42 and a positioning system 36 provided on the FPSO. The inclinometer 34 is operable to determine the incline of the sensor carrier member 42, and thus the riser 10, relative to the earth. The positioning system 36 is operable to determine the orientation of the FPSO, and thus the bend stiffener 18, relative to the earth. The two measurements are transmitted to the central processor 38. and are used to determine the incline of the riser 10 relative to the bend stiffener 18.

The central processor 38 comprises a memory 38a and a processor unit 38b. The central processor 38 is adapted to receive the bending, torsion and tension values from the local processor, the incline measurement from the inclinometer 34 and the orientation measurement from the positioning system 36. The central processor 38 is operable to determine, from the incline measurement and the orientation measurement, the incline of the riser 10 relative to the bend stiffener 18.

The central processor 38 comprises a model of the mechanical properties of the riser 10 and the bend stiffener 18 stored within its memory 38b. The central processor 38 is operable to apply the model to the bending, tension and torsion measurements and the calculated incline of the riser 10 relative to the bend stiffener 18, to thereby determine the bending, torsion and tension of the section of the riser 10 adjacent to bend stiffener 18, i.e. within the section of the riser 10 to which the carrier members 40, 42 are coupled. The bending, torsion and tension of the riser 10 is provided in real-time, and can thus be monitored as the riser 10 moves due to movement of the FPSO and waves acting on it.

The central processor 38 is further operable to determine pipe fatigue from the bending, torsion and tension of the riser 10 in the region adjacent to the bend stiffener 18.

Figure 4:
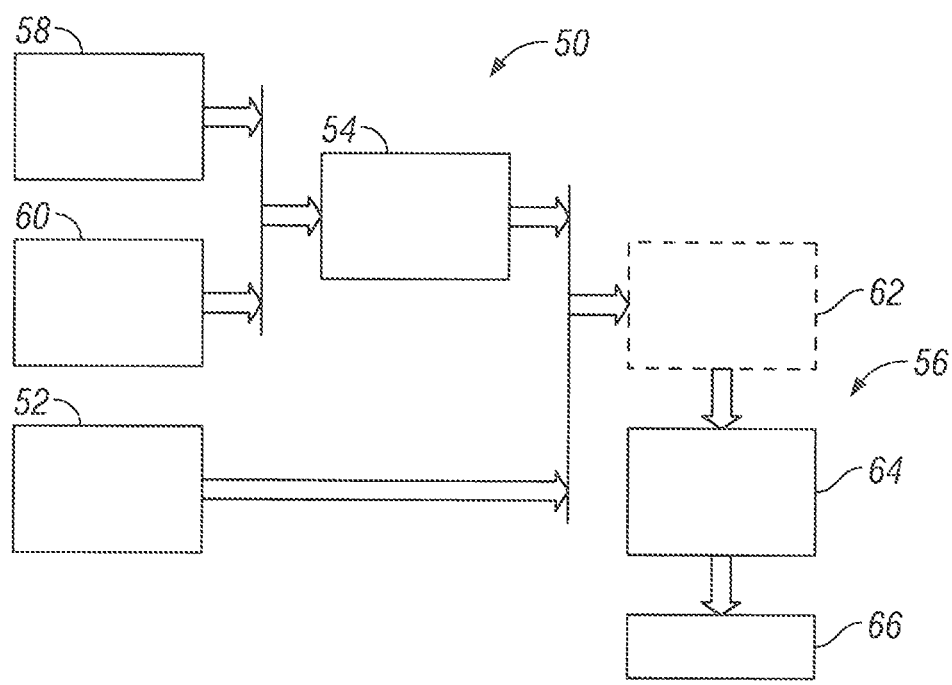
FIG. 4 is a flow chart of a method of method of monitoring the fatigue of a flexible pipe having a bend stiffener provided thereon according to a second embodiment of the invention.

A second embodiment of the invention, shown in FIG. 4, provides a method 50 of monitoring the fatigue of a riser 10 having a bend stiffener 18 provided at its end where it is coupled to an FPSO. The method 10 is described in relation to a riser 10 as shown in FIG. 1.

The method 50 comprises:
1. measuring 52 the bending, tension and torsion of the riser at a location just below (as orientated in the drawings) the bend stiffener 18;
2. measuring 54 the incline of the riser 10 relative to the bend stiffener 18 at said location; and
3. determining 56 pipe fatigue from the measured bending, tension and torsion values and the measured incline.

Step 1. comprises measuring strain 52 at a plurality of locations on the riser 10 and converting the strain measurements into bending, torsion and tension of the riser 10.

Step 2. comprises determining the incline 58 of the riser 10 relative to the earth and determining the orientation 60 of the bend stiffener 18 relative to the earth. The orientation of the bend stiffener 18 is determined by measuring the orientation of the FPSO to which the riser 10 is connected. From the measurements of the riser incline relative to the earth and the orientation of the FPSO, the incline of the riser 10 relative to the said bend stiffener 18 is calculated 54.

The measurement of bending, torsion and tension, incline of the riser and orientation of the FPSO are provided synchronously.

Step 3. comprises applying a model 62 of the mechanical properties of the riser 10 and the bend stiffener 18 to the bending, tension and torsion measurements, and the incline of the riser 10 relative to the bend stiffener 18 (as calculated in step 2.) to determine 64 the bending, torsion and tension of the riser 10 at the said location below the bend stiffener 18. The bending, torsion and tension of the riser 10 are provided in real-time.

Step 3. further comprises determining pipe fatigue 66 from the bending, torsion and tension of the riser 10 at the location below the bend stiffener 18.

The invention claimed is:

1. A flexible pipe fatigue monitoring system for a flexible pipe having a bend stiffener located thereon, the system comprising:
    a pipe monitoring system comprising:
        a sensor carrier apparatus retrofittedly coupleable circumferentially about the flexible pipe; and
        at least one strain sensor embedded in the sensor carrier apparatus and configured to measure one or more mechanical parameters of the flexible pipe;
    a pipe incline monitoring system operable to determine an incline of the flexible pipe; and
    a central processor configured to receive the mechanical parameter information from the pipe monitoring system and the incline measurement information from the pipe incline monitoring system and operable to determine fatigue of section of the flexible pipe located adjacent to the bend stiffener based upon the information.

2. The flexible pipe fatigue monitoring system of claim 1, wherein the pipe monitoring system is configured to measure one or more of bending, torsion and tension of the flexible pipe.

3. The flexible pipe fatigue monitoring system of claim 1 or 2, wherein the pipe incline monitoring system comprises an inclinometer located on the sensor carrier apparatus, the inclinometer being operable to measure the incline of the sensor carrier apparatus.

4. The flexible pipe fatigue monitoring system of claim 1, wherein the flexible pipe comprises a flexible riser pipe connected at one end to a moving platform and the bend stiffener is located at the one end.

5. The flexible pipe fatigue monitoring system of claim 4, wherein the pipe incline monitoring system further comprises a positioning system located on the platform and operable to determine the orientation of the platform.

6. The flexible pipe fatigue monitoring system of claim 5, wherein the central processor is configured to receive incline measurement information from the inclinometer and orientation measurement information from the positioning system and is operable to determine the incline of the flexible pipe.

7. The flexible pipe fatigue monitoring system of claim 6, wherein the central processor is configured to determine one or more of bending, torsion and tension of the flexible pipe.

8. The flexible pipe fatigue monitoring system of claim 7, wherein the central processor is further configured to determine pipe fatigue from said bending, torsion and tension of the flexible pipe.

9. A method of monitoring the fatigue of a flexible pipe having a bend stiffener located thereon, the method comprising:
    retrofitting a sensor carrier apparatus circumferentially about the flexible pipe, the sensor carrier apparatus comprising at least one strain sensor embedded therein;

measuring one or more mechanical parameters of the flexible pipe at a location on the flexible pipe with the at least one strain sensor;

determining the incline of the flexible pipe relative to the location via pipe incline monitoring system; and determining fatigue of a section of the flexible pipe located adjacent to the bend stiffener based on the mechanical parameter information and the incline of the flexible pipe.

10. The method of monitoring the fatigue of a flexible pipe of claim 9, further comprising measuring one or more of bending, torsion and tension of the flexible pipe.

11. The method of monitoring the fatigue of a flexible pipe of claim 9 or 10, further comprising determining the incline of the flexible pipe relative to the earth and determining the orientation of the bend stiffener relative to the earth, and from the incline relative to the earth and the orientation of the bend stiffener, determining the incline of the flexible pipe relative to the bend stiffener.

12. The method of monitoring the fatigue of a flexible pipe of claim 9, wherein the flexible pipe comprises a flexible riser pipe connected at one end to a moving platform and the bend stiffener is located at the one end, and the method further comprises determining the orientation of the platform.

13. The method of monitoring the fatigue of a flexible pipe of claim 12, further comprising determining one or more of bending, torsion and tension of the pipe.

14. The method of monitoring the fatigue of a flexible pipe of claim 13, further comprising determining pipe fatigue from the bending, torsion and tension of the pipe adjacent to the bend stiffener.

15. The flexible pipe fatigue monitoring system of claim 1, wherein the sensor carrier apparatus comprises a first and second carrier members of half-cylindrical shapes configured to be coupled to the external surface of the flexible pipe.

* * * * *